United States Patent
Naito et al.

(10) Patent No.: US 7,758,675 B2
(45) Date of Patent: Jul. 20, 2010

(54) GAS TREATMENT DEVICE

(75) Inventors: Kenta Naito, Kyoto (JP); Satoru Senbayashi, Kyoto (JP); Yuichi Hamada, Kyoto (JP); Akira Mizuno, Nagoya (JP); Junichi Kasai, Fujisawa (JP); Yoshinobu Tamura, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 636 days.

(21) Appl. No.: 11/587,816

(22) PCT Filed: Apr. 13, 2005

(86) PCT No.: PCT/JP2005/007126

§ 371 (c)(1),
(2), (4) Date: Oct. 27, 2006

(87) PCT Pub. No.: WO2005/105315

PCT Pub. Date: Nov. 10, 2005

(65) Prior Publication Data

US 2007/0245898 A1 Oct. 25, 2007

(30) Foreign Application Priority Data

Apr. 28, 2004 (JP) .............................. 2004-133267

(51) Int. Cl.
*B03C 3/15* (2006.01)

(52) U.S. Cl. .......................... 96/61; 55/DIG. 38; 95/67; 95/73; 95/78; 96/69; 96/74; 96/96; 96/98

(58) Field of Classification Search ..................... 96/61, 96/69, 74, 96, 97, 98–100; 95/67, 73, 78; 55/DIG. 38

See application file for complete search history.

(56) References Cited

U.S. PATENT DOCUMENTS

| | | | | | |
|---|---|---|---|---|---|
| 1,357,886 | A | * | 11/1920 | Meston | 96/62 |
| 3,157,479 | A | * | 11/1964 | Boles | 96/82 |
| 3,248,857 | A | * | 5/1966 | Weindel et al. | 96/49 |
| 3,398,685 | A | * | 8/1968 | Stuetzer | 417/48 |
| 3,765,154 | A | * | 10/1973 | Hardt et al. | 96/88 |
| 4,010,011 | A | * | 3/1977 | Reif | 96/61 |
| 4,098,591 | A | * | 7/1978 | van Diepenbroek et al. | 95/57 |
| 5,003,774 | A | * | 4/1991 | Leonard | 96/52 |
| 5,041,145 | A | * | 8/1991 | Kakinuma et al. | 96/52 |

(Continued)

FOREIGN PATENT DOCUMENTS

GB      2016305 A  *  9/1979  ..................... 96/96

(Continued)

OTHER PUBLICATIONS

Office Action issued in corresponding Japanese Patent Application No. 2004-133267; mailed on Apr. 30, 2008.

(Continued)

*Primary Examiner*—Richard L Chiesa
(74) *Attorney, Agent, or Firm*—Staas & Halsey LLP

(57) ABSTRACT

Gas treatment equipment including a corona electrode and a dust-collection electrode facing the corona electrode, and forming corona discharge in gas passing between the corona electrode and the dust-collection electrode by applying a high voltage between them to collect components in the gas wherein a gas turbulence accelerator is located in the vicinity of the surface of the dust-collection electrode facing the corona electrode.

18 Claims, 10 Drawing Sheets

U.S. PATENT DOCUMENTS

| | | | | |
|---|---|---|---|---|
| 5,055,115 | A * | 10/1991 | Yikai et al. | 96/59 |
| 5,066,316 | A * | 11/1991 | Ikeda | 96/52 |
| 5,084,078 | A * | 1/1992 | Suzuki et al. | 96/52 |
| 5,254,155 | A * | 10/1993 | Mensi | 96/44 |
| 5,348,571 | A * | 9/1994 | Weber | 96/68 |
| 5,707,428 | A * | 1/1998 | Feldman et al. | 96/54 |
| 6,071,330 | A * | 6/2000 | Matsubara et al. | 96/69 |
| 6,193,782 | B1 * | 2/2001 | Ray | 95/4 |
| 6,294,003 | B1 * | 9/2001 | Ray | 96/49 |
| 6,508,861 | B1 * | 1/2003 | Ray | 95/79 |
| 6,508,982 | B1 * | 1/2003 | Shoji | 422/22 |
| 6,527,829 | B1 * | 3/2003 | Malkamaki et al. | 95/71 |
| 6,872,238 | B1 * | 3/2005 | Truce | 95/29 |
| 2004/0118276 | A1 * | 6/2004 | Kim | 95/8 |
| 2006/0021503 | A1 * | 2/2006 | Thaler | 95/70 |

FOREIGN PATENT DOCUMENTS

| | | |
|---|---|---|
| JP | 3-173311 | 7/1991 |
| JP | 5-125928 | 5/1993 |
| JP | 5-154408 | 6/1993 |
| JP | 6-154651 | 6/1994 |
| JP | 3019526 | 10/1995 |
| JP | 11-342350 | 12/1999 |
| JP | 2002-030921 | 1/2002 |
| JP | 2002-361117 | 12/2002 |
| JP | 2003-509615 | 3/2003 |
| JP | 2004-199897 | 7/2004 |

OTHER PUBLICATIONS

International Search Report (dated Jul. 12, 2005) of the International Application PCT/JP2005/007126. (1pg).

* cited by examiner

GAS TREATMENT DEVICE

This application claims the benefit of PCT International Application No. PCT/JP2005/007126 filed Apr. 13, 2005 and Japanese Application No. 2004-133267, filed Apr. 28, 2004 in Japan, the contents of which are incorporated herein by reference.

BACKGROUND OF THE INVENTION

1. Field of the Invention

The present invention concerns a gas treatment device for purifying exhaust gas such as industrial gas, power plant gas, automobile gas and so on, or purifying gas emitted at various manufacturing plants, medical facilities and so on, by using corona discharge.

2. Description of the Related Art

An electrostatic agglomerator, an electrostatic dust collector or the like is used as exhaust gas treatment device for industrial gas, power plant gas, automobile gas and so on, and for gas emitted at various manufacturing plant, medical facilities and so on. In these equipments, by applying a high voltage between a corona electrode and a dust-collecting electrode, corona discharge is generated to charge floating fine particles such as particulate matters (PM) in gas. Then, the charged particles are attracted to the dust-collecting electrode to be agglomerated, grown, or caught or to be captured by electrostatic force.

In the electrostatic agglomerator using such corona discharge, only agglomeration and growing are performed as one component of a gas treatment system. The gas treatment system is composed so that a rear stage filter disposed at the downstream side will collect dust. In this case, by agglomerating and growing under electrostatic effect of the electrostatic agglomerator, even fine particles that would not completely filtered with a wide-mesh filter can be easily filtered in the rear stage filter.

Namely, bonding is generated among particulates captured on the surface of the dust-collecting electrode, by electrostatic force, which agglomerate and grow particulate. However, under the influence of the gas flow, the captured particles that have been grown will be separated from the surface of the collecting electrode and re-entrained.

These re-entrained particles are repeatedly charged, captured, and separated in the gas treatment device to make their particle size bigger gradually, and finally exhausted out from the device by re-entrainment. In this case, since the diameter of the particles to be exhausted has increased, a wide-mesh filter can easily catch these particles in the downstream. In short, it functions as electrostatic agglomerator.

Also, the electrostatic dust collector using this discharge agglomerates and grows particles, and collects dust. With such electrostatic dust collector, gas to be treated will be passed into a cylindrical body. A corona electrode is disposed in the substantial center of the dust-collecting electrode that is either formed by the cylindrical body, or separately provided from the cylindrical body. Corona discharge is generated in the gas and floating particle in the gas is charged, by applying a high voltage between the corona electrode and the dust-collecting electrode.

This charged particle is moved to the surface of the dust-collecting electrode and caught by this surface of the dust-collecting electrode by electrostatic power of an electric field formed between the corona electrode and the dust-collecting electrode. This captured particles is detached from the dust-collecting electrode by releasing or the like, collected and removed similarly as electric dust collector and so on, or burned and removed by heating with a heater and so on adjacent to the dust-collecting electrode. Thus, floating particle is removed from the gas.

As one example of such gas treatment device, Japan Utility Model Registration No. 3019526 proposes a cylindrical electric precipitator. In this precipitator, for removing white smoke and a small amount of pollutants in mist form in flue gas, a high voltage is applied to a high voltage discharge wire (corona electrode) formed by metal fine wires stretched in a metal tube, and floating particles such as flue gas exhausted from a factory are electrostatic adsorbed on the cylindrical electrode to remove them.

However, in electrostatic dust collection of industrial gas, automobile gas and so on, the moving speed of charged particle is, at most, on the order of several cm/s. Besides, the distance between the corona electrode and the dust-collecting electrode is usually set to several cm or more. Consequently, to obtain sufficient effects of agglomeration or dust collecting, a retention time, namely, treatment time of 1 s or more is required. As the result, there is a problem that the gas treatment device is difficult to be made compact.

The Inventors have found that turbulence acceleration is effective for increasing effect of agglomeration or dust collection on the facing surface of the dust-collecting electrode which is a surface facing the corona discharge. Based on their findings, experiments have been repeated and achieved the present invention. Namely, when turbulence is accelerated on or in the vicinity of the facing surface of the dust-collecting electrode, movement of the particles along the direction of the cross section of the flow passage that is in a vertical direction with respect to the main flow direction is accelerated. Thus, arrival speed of particles to the dust-collecting electrode is shortened, the probability of the collision among particles in the passage increases, and the time required for agglomeration and dust collection becomes shorter. Furthermore, when temperature of gas is high and temperature of the dust-collecting electrode is low, cooling of the gas in the vicinity of the dust-collecting electrode is accelerated because of increase of the heat conduction effect with the turbulence acceleration. Hence, the effect of a liquid bridge formation to particles is brought through condensing the components in the gas that are easily liquefied. Thus, effects of agglomeration, dust collection, and capture are further increased.

It should be noted that the present invention intends to accelerate gas turbulence in the vicinity of the dust-collecting electrode surface. There are some apparatuses whose structures might be similar to the present invention. As proposed in Japanese patent application Kokai publication No. 1991-173311, one of such apparatuses is an exhaust gas purifier in which a first electrode surface formed in a convex shape is provided in the center portion of a cylindrical second electrode serving as dust-collecting electrode. Another such apparatus is an exhaust gas purifier as proposed in Japanese patent application Kokai publication No. 1995-125928 in which, contrary to the Kokai publication No. 173311, a first electrode, as a dust-collecting electrode, is provided in the center portion of a cylindrical body where spiral grooves are formed on the inner wall as discharge electrode.

As proposed in Japanese patent application Kokai publication No. 1999-342350, there is also an air cleaner comprising a dust-collecting electrode made by the inner peripheral surface of the inside of a draft pipe with an annular (ring shape) cross-section, and a charge electrode (discharge electrode) made by an outer peripheral surface of the draft pipe, the charge electrode being formed with a convex portion having a sharpened summit.

However, in these exhaust gas purifiers or air cleaner, the convex shape, the spiral groove, the needle electrode array, and so on are composed to form an electric field concentration point for the purpose of making stable, uniform, and lower-voltage discharge. Besides, since such convex shape and so on are not for the object of turbulence acceleration, they are all provided on the discharge electrode and not on the dust-collecting electrode side. Consequently, it is impossible to accelerate turbulence on the dust-collecting electrode where particles are agglomerated and grown. Therefore, it is impossible to use the effect to improve agglomeration, growing, dust collection, and capture and so on by turbulence acceleration.

In addition, as proposed in Japanese patent application Kokai publication No. 2002-30921, there exists a plasma type exhaust gas purifying apparatus for decomposing $NO_x$ or the like in which an annular flow control member such as ring shape barrier or the like is provided on the inner surface of a discharge tube for biasing or guiding the exhaust gas flow in an outer electrode toward an inner electrode. In this apparatus, the quantity of exhaust gas passing through a portion of high plasma intensity in the vicinity of the inner electrode increases to improve the exhaust gas purifying efficiency as a whole.

Though the structure of this apparatus may be effective when chemical reactions of gas are increased by plasma, the improvement of dust collection performance can not be expected because the contact efficiency between gas and the inner surface of the tube decreases in the case of the dust collection such as capturing of particles on the inner surface of the tube to be a dust-collecting electrode.

In addition, with this structure, in order to guide the exhaust gas flow toward the inner electrode, the height of the ring shape barrier may be required to be the order of several tens % of the tube inner diameter. If such barrier structure is formed with a metal to be a ground potential, the sparking voltage will be strongly limited by the inner diameter of the ring. Accordingly, comparing to the case where there is no ring shape barrier, the voltage to be applicable will be remarkably lowered. Lowering the applied voltage greatly reduces the intensity of the electric field of the inner surface of the tube, resulting in remarkably lowered dust collection effect to the inner surface of the ground electrode.

Also, even if this ring shape barrier is formed with an insulating material, when the inner surface of the tube is formed with a metal at the ground potential, comparing to the case where there is no ring shape barrier, applicable voltage similarly decreases due to the electric breakdown across the surface of the insulating material. As the result, the field intensity of the tube inner surface lowers, deteriorating the dust collection effect.

Otherwise, if the ring shape barrier is formed with an insulating coating or an insulating body from the inner surface of the tube, it becomes extremely expensive and problems in terms of insulation durability will arise. When a gas treatment device is intended to collect dust, a structure for increasing the contact efficiency between gas and a surface of a dust-collecting electrode, with lowering the applicable voltage as less as possible is required.

SUMMARY OF THE INVENTION

In view of the above problems, the present invention has an object to provide a gas treatment device with higher performance, less pressure loss, and compact that can agglomerate, grow, or collect floating particles in gas and, moreover, that could be used as exhaust gas purifying equipment on a vehicle, based on the principle of corona discharge.

The gas treatment device for achieving the above object comprises a corona electrode and a dust-collecting electrode facing the corona electrode, and forming corona discharge in gas passing between the corona electrode and the dust-collecting electrode by applying a high voltage between them to thereby agglomerate or collect components in the gas, wherein a means for accelerating turbulence of the gas in the vicinity of the surface of the dust-collecting electrode facing the corona electrode is provided on the surface of the dust-collecting electrode or in the vicinity thereof.

As this means for accelerating turbulence, an uneven structure where continuous or discontinuous convex portions are formed on the facing surface, a structure having punched screen or the like disposed on the surface, a brush structure where fine filamentous bodies are planted, a structure where coil shape linear bodies are arranged on the surface, or other structures may be employed.

With this means for accelerating turbulence, gas turbulence is accelerated between the dust-collecting electrode and the corona electrode and, especially in the vicinity of the facing surface of the dust-collecting electrode that faces the corona electrode, and a gas flow towards the cross-section of flow passage occurs. As the result, apparently, the moving speed of the particles charged by the corona discharge is increased. Consequently, even if gas treatment time is short, for instance, sufficient agglomeration effect and dust collection effect can be deployed, increasing considerably electrostatic agglomeration performance or dust collection performance. Therefore, a gas treatment device of high performance, low-pressure loss and downsizing of the device that can perform electrostatic agglomeration or dust collection can be provided.

In other terms, though the corona discharge is partial electric discharge localized around the corona electrode, the turbulence acceleration increases the agitation effect in a direction in the flow passage cross section perpendicular to the main flow of the direction the gas. Therefore, the average time required for charging particulate across the whole flow passage space becomes shorter. Besides, charged particles come into contact (approach) in a short period of time with the facing surface of the dust-collecting electrode which faces the corona electrode, by the acceleration effect in a direction in the cross-section of the flow passage due to the turbulence acceleration. Consequently, even if the moving speed of the particles by electrostatic effect is small, they can be captured by electrostatic effect by this facing surface in a short period of time.

Also, if a turbulence acceleration body is provided on the dust-collecting electrode surface which is facing this corona electrode or in the vicinity of the dust-collecting electrode surface, the viscous resistance at this facing surface comes to affect up to the middle portion, reducing the flow rate in the gas main flow direction in the vicinity of the facing surface. Therefore, in the vicinity of the facing surface, the ratio of electrostatic migration velocity of charged particles and the gas flow rate can be set higher. Consequently, the collection of charged particles by electrostatic force can be accelerated.

The aforementioned gas treatment device is composed to form said dust-collecting electrode with a gas-impermeable cylindrical body surrounding said corona electrode and to introduce gas into the cylindrical body. Otherwise, the dust-collecting electrode is formed with a sheet body facing said corona electrode and the sheet body is surrounded together with said corona electrode by a gas-impermeable cylindrical body and to introduce gas into the cylindrical body. These compositions allow the gas flowing between the corona electrode and the dust-collecting electrode.

It should be noted that though the turbulence is accelerated through the turbulence acceleration body of the facing surface, the pressure loss of the gas passage formed with the cylindrical body increases. However, as the friction loss of this gas passage is minute in the ordinary application, the influence on the whole gas treatment device is small. On the other hand, the pressure loss according to the flow rate variation at the gas introducing portion to the cylindrical body and the gas exhaust portion from the cylindrical body is far larger than the friction loss. Therefore, there is almost no fear of remarkable increase and excess of pressure loss of the gas treatment device.

In the aforementioned gas treatment device, when said means for accelerating turbulence is made up of an uneven structure, the uneven structure can have a relative roughness $\epsilon/D$ equal to or more than 0.01 but not greater than 0.1 where the characteristic length of said dust-collection electrode is D and the maximum surface roughness of said dust-collecting electrode is $\epsilon$. In other words, this relative roughness is preferably equal or superior to 0.01 in terms for turbulence acceleration effect and equal or inferior to 0.1 in terms for discharge special uniformity and practical stability.

This uneven structure can be made up of various modes as mentioned below. First, the uneven structure is united with the dust-collecting electrode and the surface of the dust-collecting electrode is grooved. In addition, this structure is separate the dust-collecting electrode and is composed by disposing round bars and square bars on the surface of the dust-collecting electrode. Also, uneven structures of punched screen or the like of expanded metal, punching metal or the like are disposed on the dust-collecting electrode surface by adhesion, abutting, floating and so on, or a sheet body is formed with sheets having uneven structures.

It should be noted that this uneven structure may not only be structures having convex portions and concave portions disposed regularly, but also structures having irregular shape convex portions or concave portions disposed irregularly. Namely, arrangement, disposition density and so on of convex portions and concave portions may be regular or irregular. And the shape of convex portion may be different. For instance, their shape may be acuminate, triangular pyramid, square pyramid, cylindrical, cubic, rectangular, truncated pyramid, truncated cone, hemispheric, spherical, and various other shapes.

In addition, the relative roughness $\epsilon/D$ of the uneven structure is identical to those used for heat conduction, tube friction and so on. The characteristic length D in case of forming by surrounding the corona electrode with the dust-collecting electrode is hydraulic diameter defined as 4S/P, where S is the flow passage cross-section surround by the dust-collecting electrode and P is wetted perimeter. Consequently, in case of forming the dust-collecting electrode with a round pipe, D corresponds to the diameter of the round pipe. In addition, in case of forming the dust-collecting electrode with sheet bodies of parallel flat plates, D=2b, where b is the distance between the corona electrode and the flat plate.

It should be noted that an entrance region is necessary for the development of turbulence in the cylindrical body. The distance thereof is of the order of twice the characteristic length D of the cylindrical body cross-section. Therefore, it is convenient to set the cylindrical body length to equal or superior to three times the characteristic length D of the cylindrical body cross-section, and practically, it is preferable to set to 5 to 20 times D.

Besides, in the aforementioned gas treatment device, when the uneven structure is formed by inclining the upstream face of the convex portion to the downstream side of the portion, vortex appears on the wake flow side of the convex portion, and gas flow stagnates on the wake flow side of the convex portion. Consequently, the capture effect of particulate matters on the cylindrical body inner surface is further enhanced, compared to the case where the upstream face of the convex portion is formed inclining to the upstream side. As this was confirmed by experiments, the shape where the upstream face of the convex portion is inclined to the downstream side is preferable.

In the aforementioned gas treatment device, when a gas-contact portion of the means for accelerating turbulence is formed with conductive material such as a metal material or the like, the portion will be the facing electrode of the corona electrode. It should be noted that this uneven structure may be formed separately with a conductive material, and combined with a cylindrical body formed with a conductive material or a non-conductive material. When the means for accelerating turbulence is formed with an conductive material, and combined with a cylindrical body formed with a non-conductive material, the means for accelerating turbulence itself becomes dust-collecting electrode, and the gas-impermeable cylindrical body is disposed outside of the means.

Also, when the gas contact portion of the means for accelerating turbulence is made of an insulating material such as ceramics, the surface of the dust-collecting electrode will be covered with insulating material. Accordingly, charged particles matters will be difficult to lose electric charge. Therefore, re-entrainment of charged particles on the facing surface of the dust-collecting electrode that faces the corona electrode can be limited, enhancing the power to capture. As a result, the structure will be preferable when dust collection function is considered to be important.

Moreover, the aforementioned gas treatment device is so composed to be provided with catalyst on the gas contact portion of at least one of the means for accelerating turbulence and the dust-collecting electrode. According to this composition, since the contact efficiency between the gas and the facing surface of the dust-collecting electrode that faces the corona electrode is improved by the effect of the turbulence, the catalytic reaction is also accelerated. Consequently, oxidation reaction or reduction reaction of components to be purified in the gas can be accelerated. For such catalyst, noble metal catalysts including platinum or other catalysts can be used.

There also occur cases where captured charged particles deposit on the uneven structure, and fill the uneven structure. However, even in this case, charged particles can be decomposed and removed by catalyst. Upon oxidation reaction, reduction reaction, and decomposition and removal of particles by these catalyst effects, anything that is generally used such as heat from gas, and addition of a reaction enhancer can be applied. In other words, by the accelerating turbulence, combining the body for accelerating turbulence with catalyst allows to effectively perform catalyst reaction, which is a surface reaction.

And, in the aforementioned gas treatment device, the cylindrical body is composed being naturally air-cooled or forcibly cooled. By this composition, a part of gas components, for instance, moisture, unburned fuel, and so on is condensed. This liquefaction causes liquid bridge formation of particles, so that the effect of agglomeration, growing and collection will be improved.

The natural air-cooling means a passive cooling in which the cylindrical body is exposed to ambient air without preserving heat, or anything to prevent convective heat transfer or heat radiation is not disposed in the vicinity of the outside the cylindrical body. On the other hand, the forced cooling means to cool the cylindrical body by forced cooling using some positive cooling means such as a cooling fan and fin, or cooling with coolant.

In other words, in the agglomeration process of particles in gaseous phase, a so-called liquid bridge formation where liquid components existing in the form of adhesion or bonding with a particle's surface are held at the contact portion among particles. On the other hand, turbulence acceleration improves the heat transfer between the gas and the dust-collecting electrode. Therefore, cooling the dust-collecting electrode accelerates cooling the gas in the vicinity of the facing surface of the dust-collecting electrode that faces the corona electrode.

When the gas is cooled, moisture and so on contained in the gas liquefies to act as liquid bridge formation among particles. Consequently, agglomeration and collection characteristic of particles are further improved. Especially, when the gas is a combustion gas, moisture is often contained, and the liquid bridge formation effect by the gas cooling is large. Unburned fuel, hydrocarbons and so on contained in the gas also liquefy by cooling and bring liquid bridge formation effect. This is experimentally confirmed.

In addition, the aforementioned gas treatment device is composed to provide an additive supply means for supplying the gas to be introduced into the interior of the cylindrical body with additive to agglomerate or grow components in the gas. This composition further improves agglomeration performances and collection performances. As this additive, water, hydrocarbons, fuel or easily liquefiable components can be used. The addition position of additive may be upstream the cylindrical body or in the cylindrical body.

Moreover, in the aforementioned gas treatment device, it is so composed to provide a plurality of gas treatment units comprised of the corona electrode and the dust-collecting electrode made of a gas-impermeable cylindrical body surrounding the corona electrode.

Also, the aforementioned gas treatment device is composed a plurality of gas treatment units comprised of a combination of the corona electrode and the dust-collecting electrode formed by the sheet body facing the corona electrode in one cylindrical body. Otherwise, it is composed a plurality of gas treatment units comprised of the corona electrode, the dust-collecting electrode formed by the sheet body facing the corona electrode, and the cylindrical body surrounding the corona electrode and the dust-collecting electrode. With these compositions, a gas of high flow rate can be accommodated.

As described hereinbefore, according to the gas treatment device of the present invention, as it is composed by providing means of accelerating turbulence in the vicinity of or on the facing surface of the dust collecting electrode, which is non-discharge electrode facing to corona electrode, to accelerate gas turbulence in the vicinity of the facing surface of the dust collecting electrode, so the agitation effect in the flow passage cross-section can be increased, by said means due to acceleration of gas turbulence in the flow passage, especially, in the vicinity of the facing surface of the dust collecting electrode.

Therefore, it can be planned to reduce the period of time necessary for charging components in the gas in the whole flow passage space, facilitate the contact of charged particles with the facing surface of the dust-collecting electrode which faces the corona electrode, and lower the main flow direction flow rate of the gas in the vicinity of the facing surface, and the capture of charged particles by the electrostatic force can further be accelerated.

Consequently, the electrostatic agglomeration performance and electrostatic collection performance to the charged particles can be improved remarkably, and the gas treatment device for performing electrostatic agglomeration and electrostatic collection can be improved in performances, reduced in pressure loss, and, reduces in size.

DETAILED DESCRIPTION OF THE INVENTION

Figure 1:
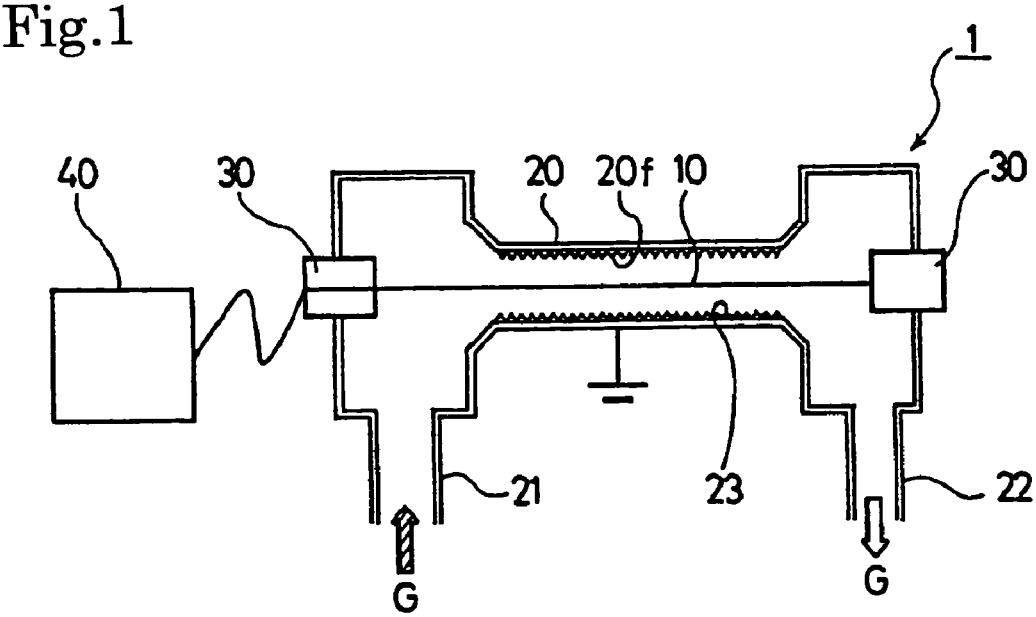
FIG. 1 is a schematic side cross-section showing a composition of a gas treatment device of a first embodiment according to the present invention.
Figure 2:
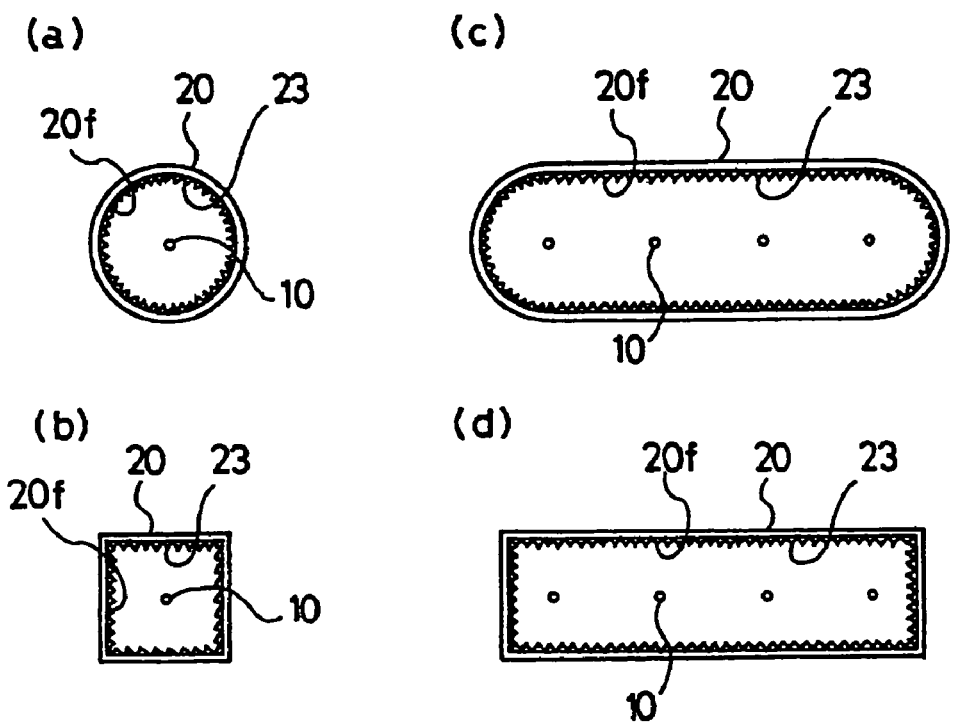
FIG. 2 shows an example of cross-section of a cylindrical body of the gas treatment device of the first embodiment according to the present invention, in which (a) shows an example of circle, (b) an example of square, (c) an example of flat body with round end section, and (d) an example of rectangle.

Now, the gas treatment device in embodiments according to the present invention shall be described referring to drawings. As shown in FIG. 1 and FIG. 2, a gas treatment device 1 of a first embodiment of the present invention comprises a corona electrode 10 for applying a high voltage for generating corona discharge and a cylindrical body 20 surrounding this corona electrode and becoming a dust-collecting electrode.

The corona electrode 10 may be an electrode that has a high level of electric field concentration factor. The corona electrode 10 is formed using a linear (wire-like) or rod-shaped electrode, such as a fine electrode, a square electrode and an electrode with uneven structure. The cylindrical body 20 is made of conductive material and surrounds the corona electrode 10. In addition, the cylindrical body 20 is provided with a gas inlet part 21 on the upstream side, and a gas outlet part 22 on the downstream side.

This corona electrode 10 and the cylindrical body 20 are in an electrically insulated state relative each other by an insulator 30 or the like. The corona electrode 10 is to be connected to a high voltage source 40. The high voltage to be generated by this high voltage source 40, generally, is preferably direct current voltage with negative polarity. But it may be any of direct current voltage, alternating current voltage or pulsed voltage. Besides, the polarity of this high voltage may be negative or positive.

In addition, the cylindrical body 20 is composed as dust-collecting electrode and not as a discharge electrode. Though, in FIG. 1, the cylindrical body 20 is electrically grounded and kept at the ground potential, it may also be kept at another potential as necessary. The voltage applied between this corona electrode 10 and the cylindrical body 20 may be any type of voltage that can generate corona discharge in the gas G passing between this corona electrode 10 and the cylindrical body 20.

The cross-section of this cylindrical body 20 is not particularly limited. Considering the stability of corona discharge, it is preferably circular, but it may also be square or other forms. Especially, in case where a plurality of corona electrodes 10 is to be disposed, the cross-section of this cylindrical body 20 may be elliptical, triangular, rectangular, or other polygonal shape. Examples of cross-sections of this cylindrical body 20 are shown in FIG. 2.

Then, the gas G is made to pass into the interior of the cylindrical body 20 and, at the same time, a high voltage is applied between the corona electrode 10 and the cylindrical body 20, to form corona discharge in the interior of the cylindrical body 20. Components such as particulate matters (PMs) which are in the gas G passing the interior of the cylindrical body 20 is charged by this corona discharge. Then, this charged particle is agglomerated or collected.

Now, this agglomeration, growing and collecting shall be described below.

The impression of high voltage forms a non-uniform electric field in the vicinity of the corona electrode 10 and a non-destructive electric discharge, namely corona discharge space is formed locally around the corona electrode 10, in the gas G. In the gas G, this corona discharge generates plenty of positive ions ionized by the collision of rapid electron and rapid electron and negative ions by the electron attachment.

If the gas G containing PM is introduced into this corona discharge space, particles will be charged almost instantaneously, by the collision of electron, positive ion, negative ion and particles (components in the gas) such as PM. The particles charged by this process are collected with the dust-collecting electrode 20 by the Coulomb force.

In case of collecting PM by electric dust collecting effected by means of this corona discharge, finer particles of PM can be collected selectively compared to the case of mechanical trapping by an ordinary physical filter. Therefore, there is no possibility of clogging even by a relatively continuous operation for a long time.

Then, in the present invention, a means for accelerating turbulence 23 is installed in the vicinity of a facing surface (inner surface) 20f facing the corona electrode 10 of this cylindrical body 20 or on a facing surface 20f. This means for accelerating turbulence 23 may be formed by working the facing surface 20f or disposing the structure different from the cylindrical body 20 by abutting to or lifting from the facing surface 20f.

This means for accelerating turbulence 23 may be composed with an uneven structure (protuberance structure) 23. Concerning this uneven structure 23, it may be referred to the protuberance structure for enhancing the heat transfer characteristics. Concrete examples of this uneven structure are shown in FIG. 9 to FIG. 17.

Figure 9:
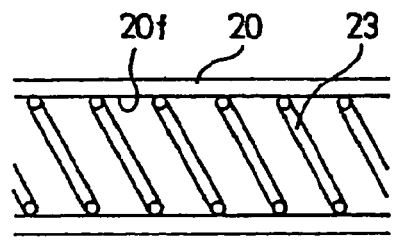
FIG. 9 is a schematic partial side cross-section showing an uneven structure formed by a plurality of rods that is spirally inserted into the cylindrical body.
Figure 10:
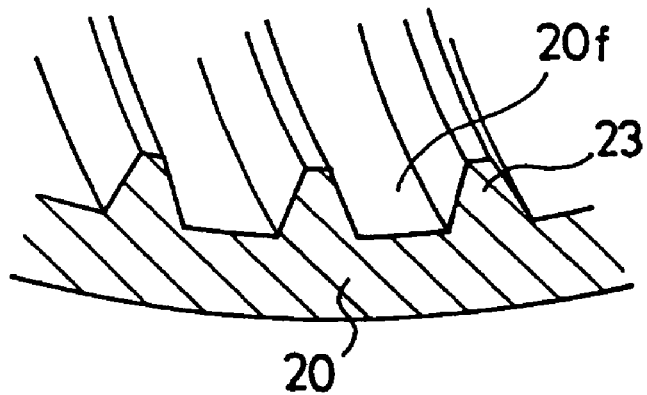
FIG. 10 is a schematic partial perspective view showing a structure where trapezoidal convex portions are formed by grooving the inner surface of the cylindrical body.
Figure 11:
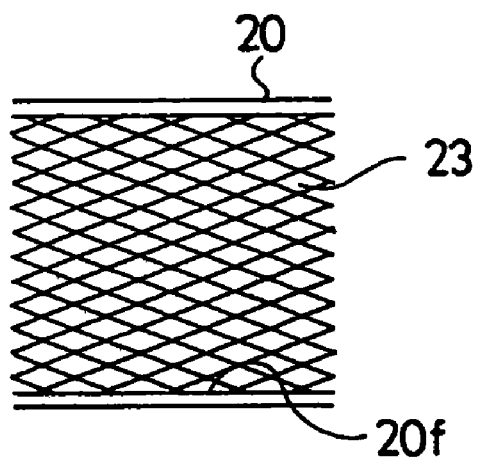
FIG. 11 is a schematic partial side cross-section showing a tubular structure with grooves on the inner surface having uneven structures formed by providing grid grooves on the inner surface of the cylindrical body.
Figure 12:
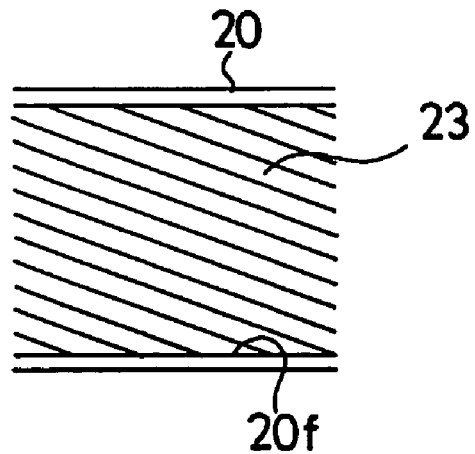
FIG. 12 is a schematic partial side cross-section showing a tubular structure with grooves on the inner surface having uneven structures formed by providing spiral grooves on the inner surface of the cylindrical body.

In FIG. 9, a single or a plurality of linear body (round bar or square bar) 23 is introduced spirally into the cylindrical body 20 and wound around the inner surface 20f of the cylindrical body 20. In FIG. 10, a trapezoidal convex portion 23 is formed being grooved on the inner surface 20f of the cylindrical body 20. Also, in FIG. 11 and FIG. 12, a tubular structure with inner surface groove is realized by providing regular relief unevenness such as grid grooves or helical grooves.

Figure 13:
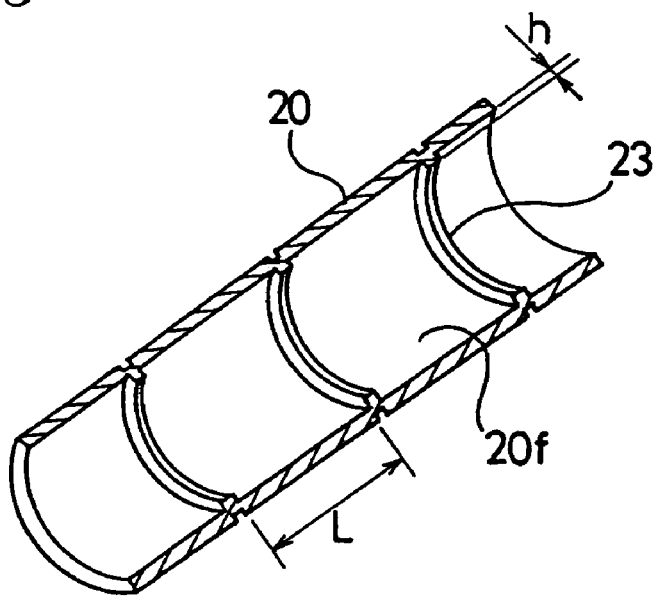
FIG. 13 is a schematic partial perspective view showing a tubular structure with grooves on the inner surface having uneven structures formed by disposing ring shape convex portions with intervals on the inner surface of the cylindrical body.
Figure 14:
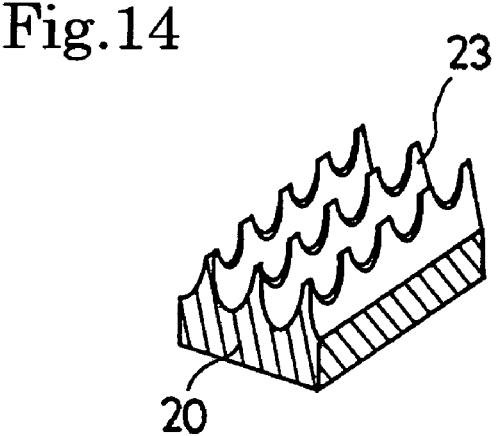
FIG. 14 is a schematic partial perspective view showing an uneven structure to be made up of fins having a three-dimensional structure.
Figure 15:
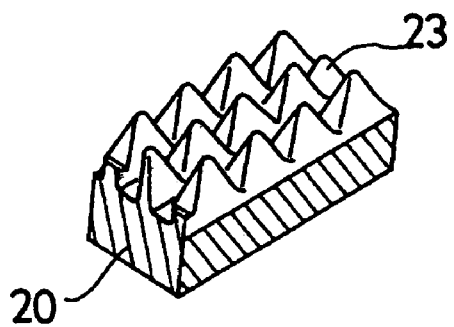
FIG. 15 is a schematic partial perspective view showing another uneven structure to be made up of fins having a three-dimensional structure.

Besides, FIG. 13 shows a structure where ring shape convex potions 23 are formed with an interval on the inner surface 20f of the cylindrical body 20. Also, FIG. 14 and FIG. 15 shows an uneven structure 23 composed with fins having a three-dimensional structure. Though not shown by drawings, disorderly unevenness can be formed by the blast treatment of the inner surface 20f of the cylindrical body 20. Such unevenness may be formed uniformly on the facing surface 20f, or disposed discretely. In case of FIG. 13, it will also be effective to dispose with an interval L of the order of 20 times the representative height h.

The cylindrical body 20 having this uneven structure 23 can be manufactured as below. First, the inner surface 20f of the cylindrical body 20 is directly machined to include grooving and so on. Second, the surface of a sheet like plate material is machined to make it uneven then and shaped into a cylindrical body 20. While a third one is manufactured by shaping a plate material provided with unevenness by working or a plate already provided with unevenness into a form introducible into the cylindrical body and then inserting it into the cylindrical body 20. A fourth one is manufactured by inserting a sheet shape body having already unevenness as available in the market into the cylindrical body 20.

As sheet material shaped already having unevenness, sheet shape protuberances such as metal net, punched metal, expanded metal or the like are useful. Besides, as this sheet material, slit grill, dia-screen, dimple screen (imperforated), dimple screen (perforated), slit bay screen, bridge bay screen, triangle bay screen, semi-circular bay screen or other punched screens may also be used.

Figure 16:
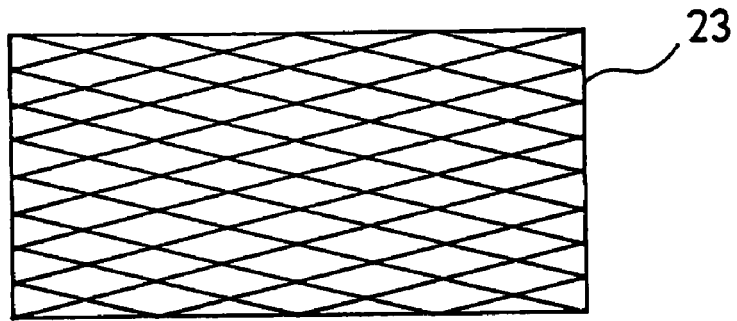
FIG. 16 is a partial plan view showing an expanded metal without rolling.
Figure 17:
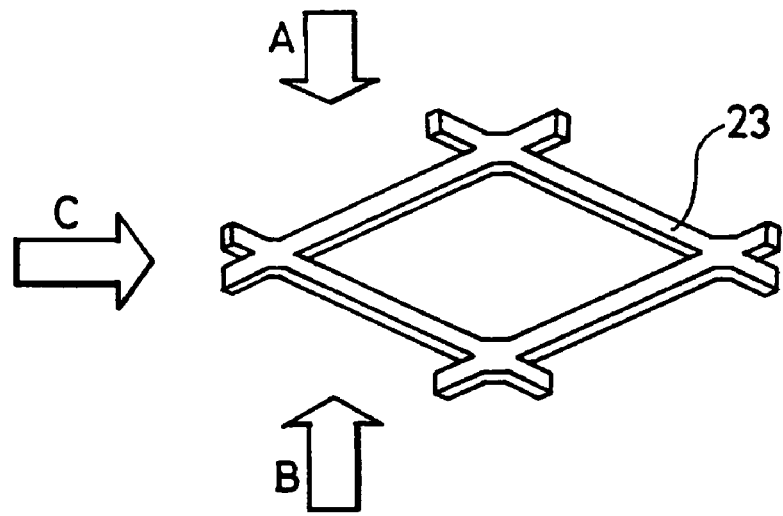
FIG. 17 is a partially enlarged view of FIG. 16 showing the direction of the mesh and the gas flow direction.

And, in case of un-rolled expanded metal 23 as shown in FIG. 16 and FIG. 17, grain is oriented, and if gas flows in any grain direction, there is always effect by the turbulence acceleration, and the improvement of agglomeration effect and dust collecting effect can be observed.

Concerning this orientation, in case where the cylindrical body 20 is inserted so that gas flows in A direction, short grain direction, both agglomeration effect and dust collecting effect were improved more than the case where it is inserted so that the gas flow in other directions B, C. In the former case, the fluid stagnates in the rear side of the projection.

For A, B and C, though there is almost no difference of electric field distribution (especially, completely identical for A and B) in the cylindrical body, but their effect is obviously different. Consequently, it is evident that the fluidal function of the uneven structure of the inner surface of cylindrical body influences considerably the agglomeration effect and dust collecting effect.

Figure 18:
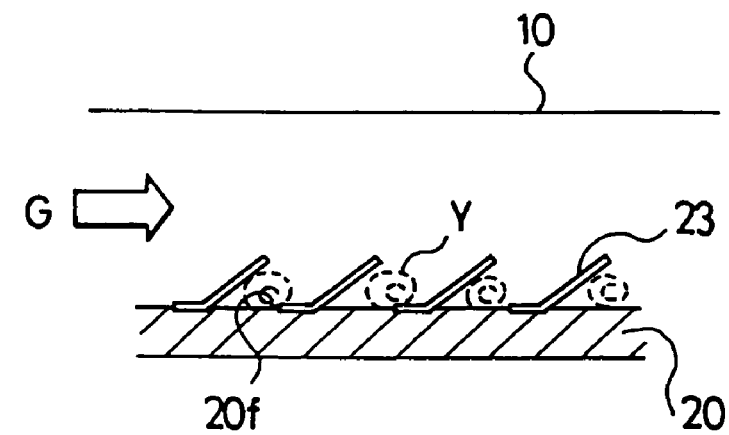
FIG. 18 is a partial side cross-section showing a composition where the upstream face of the convex portion is inclined to the downstream side.
Figure 19:
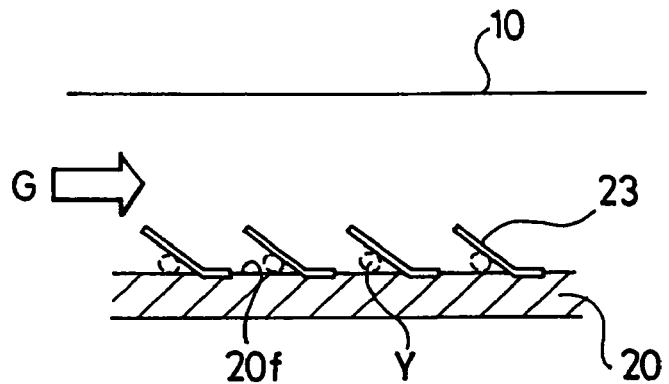
FIG. 19 is a partial side cross-section showing a composition where the upstream face of the convex portion is inclined to the upstream side.
Figure 20:
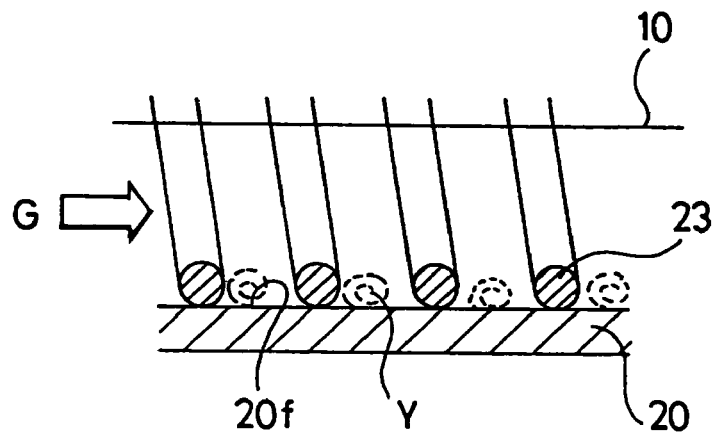
FIG. 20 is a partial perspective view showing a composition where gas flow stagnates on the wake flow side of the convex portion.

Namely, the uneven structure 23 is formed, as shown in FIG. 18, so that the upstream face of the convex portion 23 is inclined to the downstream side. There, a vortex is generated on the wake flow side of the convex portion 23, and the gas flow stagnates Y on the wake flow side of the convex portion 23. If composed as shown in FIG. 18, the collection effect of charged particles such as particulate matter (PM) or the line on the facing surface 20f of the cylindrical body 20 is more enhanced than the composition as shown in FIG. 19. Besides, the composition as shown in FIG. 20 also generates stagnation Y of gas flow on the wake flow side of this convex portion.

Then, as for the dimension of this uneven structure 23, the relative roughness $\epsilon/D$ shall be equal or superior to 0.01 and equal or inferior to 0.1. Here, the characteristic length of the cross-section of the cylindrical body 20 is D, and the maximum surface roughness of the surface 20f is $\epsilon$. This relative roughness ($\epsilon/D$) is set to equal or superior to 0.01 in order to obtain a desirable turbulence acceleration effect. It is set to equal or inferior to 0.1 in order to obtain desirable discharge special uniformity and stability.

Now, the characteristic length D of this cross-section and the relative roughness $\epsilon/D$ that should be called a dimensionless characteristic length of the uneven structure of the facing face 20f of the cylindrical body shall be described. The characteristic length D in the case of forming the dust-collecting electrode with the cylindrical body 20 is identical to the length used in heat transfer engineering, and so on. D=4S/P, where S is the flow passage cross-section surrounded by the cylindrical body 20, P is wetted perimeter. In case of round tube, D corresponds to the diameter of the round tube.

Then, as the order of turbulence and the tube friction resistance has a deep relation to each other, the relative roughness ($\epsilon/D$) having a strong relation with the tube friction resistance $\lambda$ of the cylindrical body 20 becomes a good indicator of the turbulence acceleration effect. As it can be understood from the Moody diagram showing the relation among Reynolds number R, relative roughness ($\epsilon/D$) of the tube wall and tube friction resistance $\lambda$, if the relative roughness ($\epsilon/D$) becomes equal or superior to 0.01, the increase rate of tube friction resistance $\lambda$ increases suddenly. Therefore, it can be understood that the turbulence acceleration effect increases considerably by the uneven structure 23.

Practically, it has been confirmed that the electrostatic dust collecting function increases remarkably if the relative roughness ($\epsilon/D$) of the uneven structure 23 becomes equal or superior to 0.01. As the result, it is preferable to make the Reynolds number R (=UD/ν) be the area from 2,000 to 100,000, in short, area becoming the turbulence area from the transition area. It should be noted that, here, U is gas main flow rate or average flow rate in the cylindrical body 20 and ν is gas coefficient of kinetic viscosity.

The Inventors performed experiments to observe the relation between the relative roughness ($\epsilon/D$) of the uneven structure 23 and the dust collection effect. According to the experimental results, in case where the cylindrical body 20 is made of a round tube of D=59 mm, the dust collecting performance was the same as the case without an uneven structure ($\epsilon$=0, $\epsilon/D$=0), when the uneven structure 23 was formed by inserting a foam metal sheet ($\epsilon$<0.5 mm, $\epsilon/D$<0.008) and when the uneven structure 23 was formed by inserting a metal net ($\epsilon$~0.5 mm, $\epsilon/D$~0.008). On the other hand, in case of forming the uneven structure 23 by inserting expanded metal 1 ($\epsilon$~2 mm, $\epsilon/D$~0.03), expanded metal 2 ($\epsilon$~3 mm, $\epsilon/D$~0.035), round bar spiral ($\epsilon$~2 mm, $\epsilon/D$~0.03), square bar spiral ($\epsilon$~2 mm, $\epsilon/D$~0.03), the dust collecting performance was found to be more excellent than the case without uneven structure.

Now, the length of the cylindrical body 20 shall be described. An entrance region is necessary for the development of turbulence in the cylindrical body 20. The distance thereof is of the order of twice the characteristic length D of the cross-section of the cylindrical body. Therefore, it is convenient to set the length of the cylindrical body to equal or superior to twice the characteristic length D of the cross-section of the cylindrical body. In practice, it is preferable to set to 5 to 20 times D. This allows making the equipment 1 compact.

More particularly, it can be explained as follows. Whether it concerns laminar flow or turbulence, the speed distribution across the tube cross-section does not immediately stabilize. Immediately from the tube inlet, the flow does not develop laminar flow or turbulence. And, an entrance region La is necessary for a sufficient development of flow in the tube (in the parallel flat plate in case of parallel flat plate). For this entrance region La generally, the value La/D becomes several hundreds for laminar flow, and 50 to 100 for turbulence. In short, the entrance region La is several tens or several hundreds of the diameter D. Consequently, for instance, if the diameter is 50 mm, the entrance region La becomes the order of a meter (m).

With this entrance region La, the velocity boundary layer does not develop sufficiently. Therefore, the gas velocity in the vicinity of the dust-collecting electrode 20 becomes larger. In this part, the ratio of the electrostatic migration velocity of charged particles by electrostatic force and the gas velocity is small. This constitutes a negative factor in terms of capture function. Also, charged particles once captured on the dust-collecting electrode 20 are re-entrained easily by the gas flow. Especially when electric resistance of the particles is low, such as in the case of carbon base one or the like, the particles are re-entrained more easily. Therefore, it is necessary to lower the flow rate of the whole, or to make the tube length sufficiently longer than the entrance region. Hence, the equipment volume increases.

Therefore, the disposition of means for accelerating turbulence 23 allows making the entrance region La extremely short. It can be considered that it is because of acceleration of detachment of the velocity boundary layer, inferring from the increase of tube friction coefficient. This can be inferred from the literature of examination of the flow where protuberances are provided actually on the tube inner surface. Namely, the disposition of the means for accelerating turbulence 23 shortens the entrance region La, and the value of La/D becomes on the order of 2.

Now, the material of the means for accelerating turbulence 23 shall be described. This means for accelerating turbulence 23 is shaped using a conductive material such as metal or an insulation material such as ceramics. Compositions as shown in FIG. 21 to FIG. 24 can be devised, because at least one of this means for accelerating turbulence 23 or the cylindrical body 20 is required to become the facing electrode of the corona electrode 10.

Figure 21:
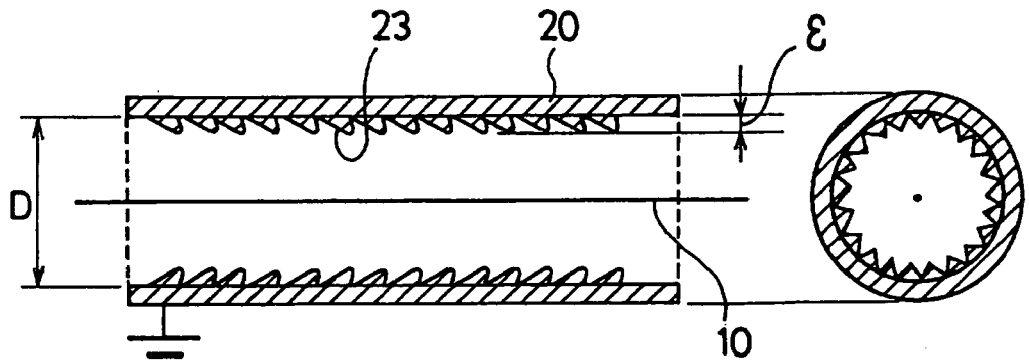
FIG. 21 shows a composition where both of cylindrical body and the means for accelerating turbulence are formed with conductive material.
Figure 22:
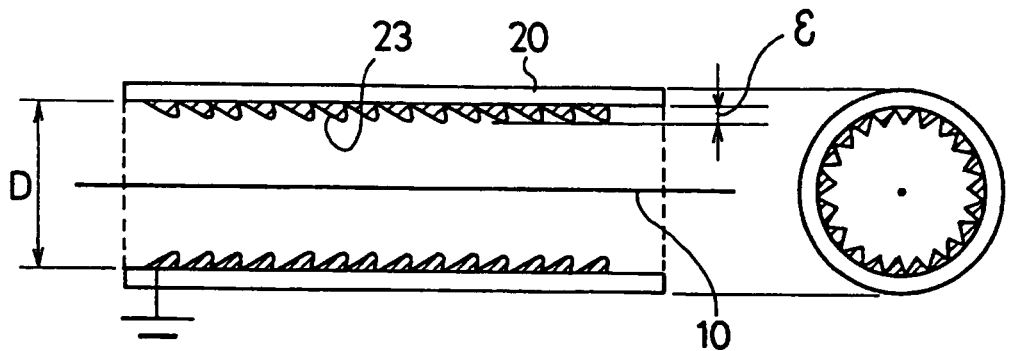
FIG. 22 shows a composition where the cylindrical body is made of insulating material while the means for accelerating turbulence is formed with conductive material.

In FIG. 21, both the cylindrical body 20 and the means for accelerating turbulence 23 are made of conductive material. Then, it is so composed to make both of this cylindrical body 20 and the means for accelerating turbulence 23 the facing electrode of the corona electrode 10. And, in FIG. 22, the cylindrical body 20 is made of insulation material, and, the means for accelerating turbulence 23 is made of conductive material. There, it is so composed to make the means for accelerating turbulence 23 the facing electrode of the corona electrode 10. It should be noted that, in case of using conductive material for the means for accelerating turbulence 23, if the relative roughness ($\epsilon/D$) increases, the distance between electrodes with the corona electrode 10 becomes partially shorter and the upper limit of the applied voltage lowers, attention is required.

Then, these portions in contact with gas are coated with insulation material such as ceramics. This makes it difficult to lose the charge of captured charge particles, permitting suppression of exhaust particles by re-entrainment. In addition, the effect to prevent the cylindrical body 20 and the means for accelerating turbulence 23 from corrosion by the gas G also appears.

Figure 23:
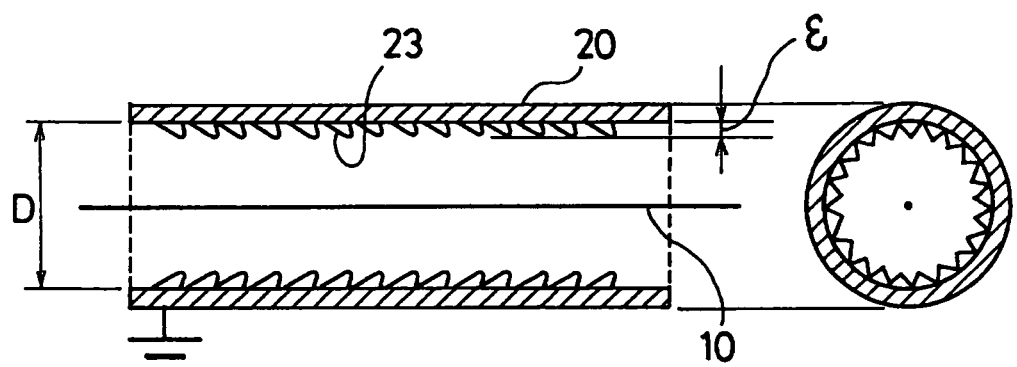
FIG. 23 shows a composition where the cylindrical body is made of conductive material while the means for accelerating turbulence is formed with insulating material.

In FIG. 23, the cylindrical body 20 is made of a conductive material and the means for accelerating turbulence 23 is made of an insulation material such as ceramics respectively. There, the cylindrical body 20 is made as the facing electrode facing the corona electrode 10, and the portion in contact with the gas G shall be an insulating object. Thereby, it can be planed to prevent re-entrainment and corrosion by the gas G.

Figure 24:
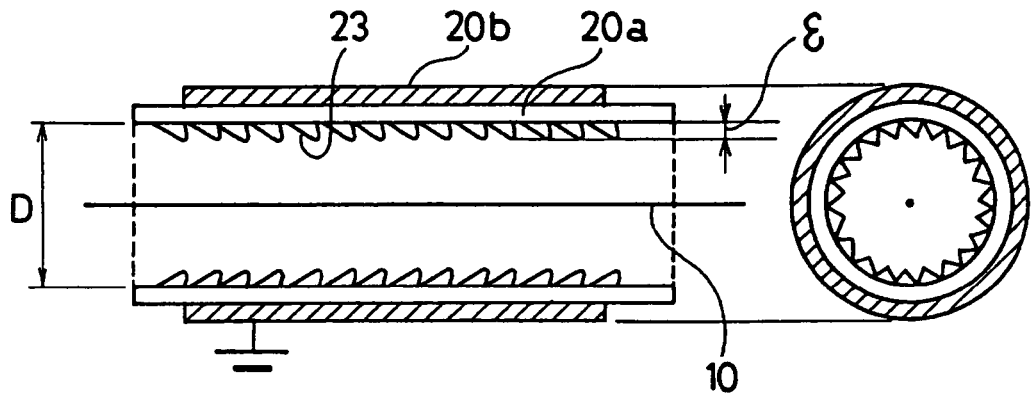
FIG. 24 shows a composition where both of inner peripheral of the cylindrical body and the means for accelerating turbulence are formed with insulating material, and an outer peripheral of the cylindrical body made of conductive material is disposed.

In FIG. 24, the cylindrical body 20 is composed of an inner peripheral portion 20a forming the gas passage and an outer peripheral portion 20b surrounding the outer side of the inner peripheral portion 20a. At the same time, the inner peripheral portion 20a and the means for accelerating turbulence 23 are made of an insulation material. And, the outer peripheral portion 20b is formed with a conductive material. This outer peripheral portion 20b is made as the facing electrode facing the corona electrode 10. This composition also permits to plan the prevention of re-entrainment and corrosion by the gas G. Since the outer peripheral portion 20b, which becomes the facing electrode of the corona electrode 10, is completely free from contact with the gas G, corrosion due to the gas G can be prevented completely.

Next, the composition for providing catalyst shall be described. It is so composed to install a catalyst in the gas contact portion of at least one of this means for accelerating turbulence 23 and the cylindrical body 20. This composition increases the contact efficiency between the gas G and the means for accelerating turbulence 23 and the facing surface 20f of the cylindrical body 20. At the same time, if the means for accelerating turbulence 23 is made of an uneven structure, the effective catalyst surface area is also increased, improving the reaction efficiency. Therefore, the catalyst reaction also can be accelerated considerably. In addition, as the catalyst surface is exposed to the discharge field, the synergy effect with radicals generated by the discharge increases, further increasing the reaction efficiency.

As this catalyst, an oxidation reduction catalyst supporting noble metals such as platinum and so on or an NOx occlusion reduction catalyst having NOx occlusion ability and so on can be used. The function of these catalysts allows oxidation combustion treatment of particulate matters deposited on the uneven structure which is the means for accelerating turbulence 23 or oxidation reduction treatment of noxious components such as NOx or the like in the gas G.

The use of a catalyst presents, especially, the following merits. Sometimes, captured particulate matters deposit on the uneven structure and bury the uneven structure. However, even in this case, deposited particulate matters or the like can be decomposed and removed by catalyst function. And, those utilized for accelerating ordinary catalyst reaction such as gas heating, addition of reaction adjuvant and so on can be applied, during oxidation reaction, reduction reaction of this catalyst or combustion removal of particulate matters. In addition, the turbulence acceleration allows performing the catalyst reaction, which is a surface reaction, more effectively.

Now the disposition of means for heating shall be described. Means for heating such as (not shown) an electric heater and so on is integrated in at least one of the means for accelerating turbulence 23 or the cylindrical body 20. This composition allows planning catalyst activation and combustion treatment by heating with the means for heating, when particulate matters or gas like components deposited on the means for accelerating turbulence 23 attain a predetermined deposit quantity or a predetermined time has elapsed.

As for the integration structure of this electric heater, it can be added to the uneven structure 23 by knitting in insulation coated heater wires or by winding spirally double insulation type electric heaters. It should be noted that, in the case of collecting PM in the exhaust gas of an internal combustion engine such as a diesel engine, the combustion can be started from a low temperature such as 150° C. to 200° C., because PM caught by the dust-collecting electrode 20 is exposed to the corona discharge field. Consequently, damage by the high temperature combustion during the combustion removal can be prevented. Moreover, the combustion can be started by the exhaust gas temperature control of the engine.

Next, the cooling of the cylindrical body 20 shall be described. It is so composed to be air-cooled via naturally or be forcibly cooled the outer surface side of this cylindrical body 20, because liquid bridge formation among particles plays an important role in the particle agglomeration process in the gas phase.

Figure 25:
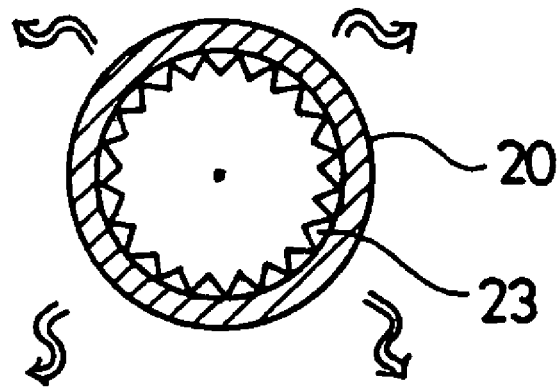
FIG. 25 shows a composition where the outer surface of the cylindrical body is open to the atmosphere to facilitate naturally convective heat transfer.

In this natural air-cooling, the outer surface of the cylindrical body 20 shall not be insulated. And, as shown in FIG. 25, the outer surface of the cylindrical body 20 shall be kept open to the atmosphere. In addition, the cylindrical body 20 shall not be enclosed in a (not shown) separate cylindrical body such as case or the like of the gas treatment unit 1. In short, the natural heat convection is facilitated through making the contact with the outdoor air easy, for instance, through perforating said separate cylindrical body for aeration. Also, the temperature of surrounding members is lowered, in order to accelerate the cooling effect through radiation. In addition, contact can be made with a heat conductor, in order to increase the cooling effect by heat conduction.

Moreover, cooling fins for accelerating heat transfer to the outside of the cylindrical body 20 may also be provided on the outer surface of the cylindrical body 20. As for this cooling fin, for instance, smooth annular fin, slot fin, tent fin, strip fin, wire loop fin or the like used generally for the heat exchanger and so on can be employed.

Figure 26:
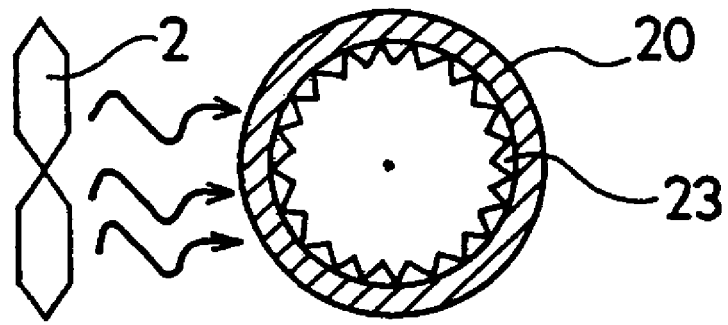
FIG. 26 shows a composition where a cooling fan for accelerating the heat radiation to the outside of the cylindrical body is disposed outside the cylindrical body.
Figure 27:
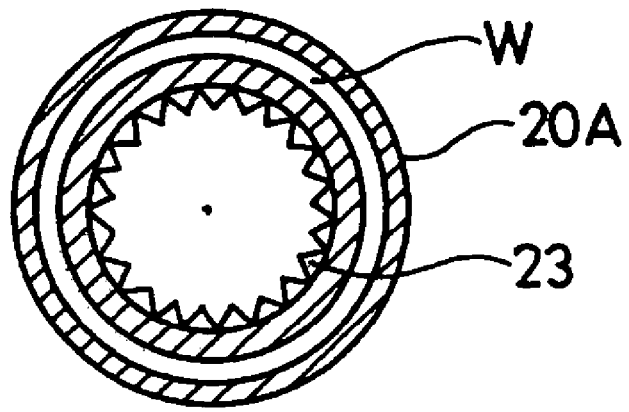
FIG. 27 shows a composition where the cylindrical body is formed as double pipe structure in order to forcibly cool by a coolant.

And, in the forced cooling, as shown in FIG. 26, the forced cooling with convection heat transfer is executed by blowing on the outer surface of the cylindrical body 20 by means of a fan 2 and so on. Or, as shown in FIG. 27, a cylindrical body 20A is composed as a double structure where the coolant W such as cooling water or the like passes, and the cylindrical body 20 is forcibly cooled with the coolant W. In case of loading on a vehicle such as automobile or the like, it may so composed to be cooled by wind during vehicular travel. Without limiting to these cooling means, general cooling means can be applied.

Then, by cooling the outer surface side of this cylindrical body 20, gas G, especially gas G in the vicinity of the inner surface 20f of the cylindrical body 20 is cooled. Therefore, moisture or the like contained in this gas G is condensed into a liquid and acts as liquid bridge formation among particles, improving the particle agglomeration function or capture function. More particularly, in the case where the gas G to be treated is a combustion gas, it often contains moisture, and unburned fuel, hydrocarbons or the like. Consequently, these components are liquefied partially by cooling and bring a liquid bridge formation function, making the cooling effect on the outer surface side of this cylindrical body 20 more important.

Then, by cooling the outer surface side of this cylindrical body 20, gas G, especially gas G in the vicinity of the inner surface 20f of the cylindrical body 20 is cooled. Therefore, moisture or the like contained in this gas G is condensed into a liquid and acts as liquid bridge formation among particles, improving the particle agglomeration function or capture function. More particularly, in case where the gas G to be treated is combustion gas, it often contains moisture, and, it contains also unburned fuel, hydrocarbons or the like. Consequently, these components are liquefied partially by cooling and bring a liquid bridge formation function, making the cooling effect on the outer surface side of this cylindrical body 20 more important.

According to the bench test results, in case where the outer surface of the cylindrical body is forcibly cooled by wind, the removal rate of particulate matters is 92%, while, in case where the outer surface of the cylindrical body is not forcibly cooled by wind, the removal rate of particulate matters is 88%.

Now, a gas treatment device according to a second embodiment shall be described.

Figure 3:
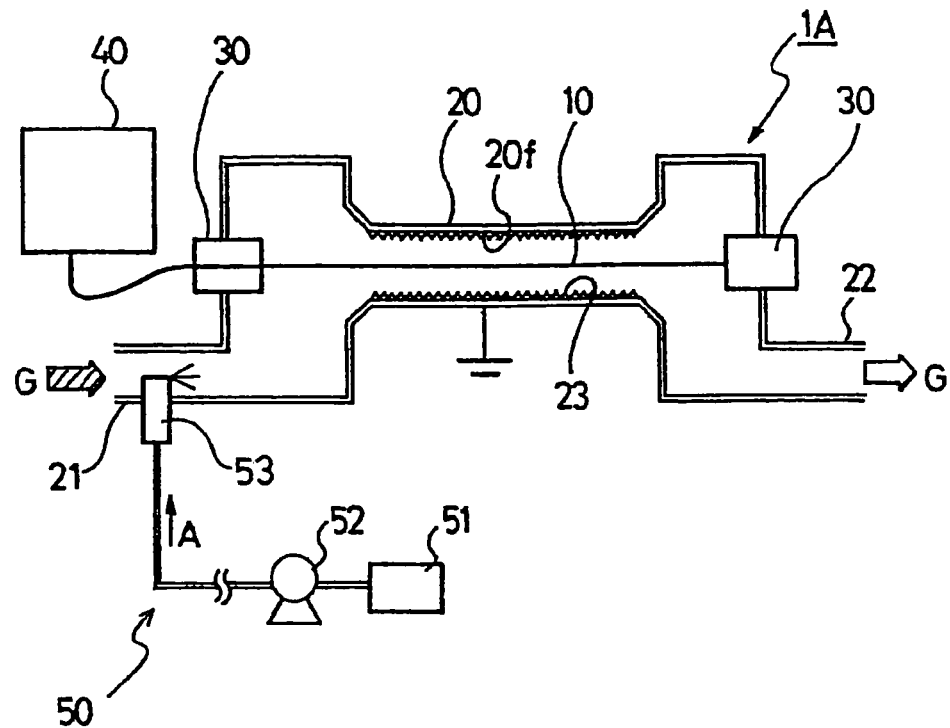
FIG. 3 is a schematic side cross-section showing a composition of a gas treatment device of a second embodiment according to the present invention.

The gas treatment device 1A of the second embodiment shown in this FIG. 3 is composed to provide an additive supply means 50 at the gas inlet part 21. This additive supply means 50 supplies the gas G to be introduced into the interior of the cylindrical body 20 with an additive. A for agglomerating or growing components in the gas G, at the gas inlet part 21. As this additive A, water, hydrocarbons, surface-active agents and, in case of gas for inner combustion engine, fuels and so on can be used. Also, there can be used an injector 52 for receiving the additive A supplied from the additive tank 51 or fuel tank and spraying the additive into the interior of the gas inlet part 21 via a valve 53. Except for this composition, the composition of the gas treatment device 1A is same as the gas treatment device 1 of the first embodiment.

According to the additive supply means 50 of the gas treatment device 1A of this second embodiment, additive A can be sprayed into the gas G in order to improve the particle agglomeration by the liquid bridge formation and the capture performance on the inside surface 20f of the cylindrical body 20. This additive A accelerates the liquid bridge formation. It should be noted that the addition position of the additive A is not limited to the gas inlet part 21 shown in FIG. 3, but it may be inside of the cylindrical body 20, or, upstream of the gas inlet part 21. Besides, in case of treating gas from an internal combustion engine, it may be so composed to add unburned fuel as additive A to the gas, by post-injection or the like in the fuel injection of an internal combustion engine cylinder.

Now, a gas treatment unit according to a third embodiment shall be described.

Figure 4:
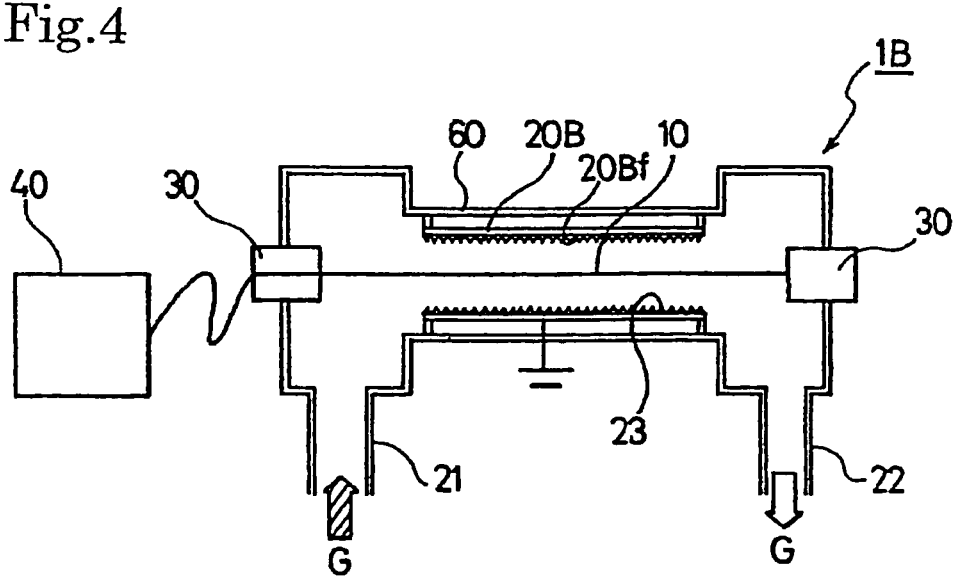
FIG. 4 is a schematic side cross-section showing a composition of a gas treatment device of a third embodiment according to the present invention.
Figure 5:
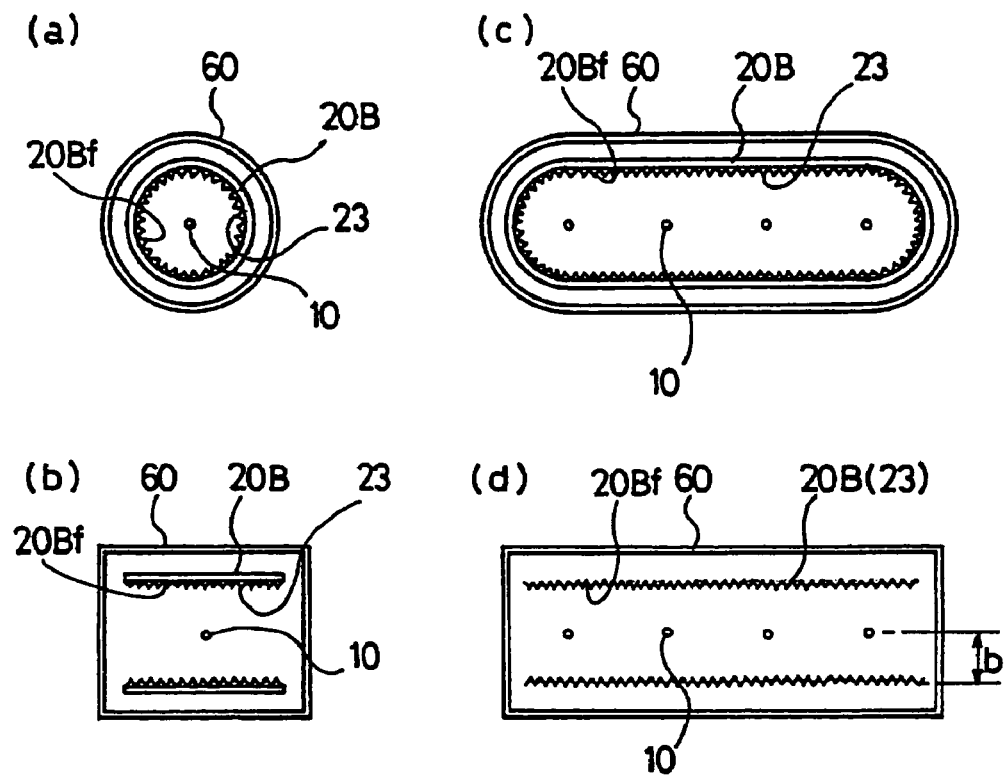
FIG. 5 shows an example of a shape of a cross-section of a cylindrical body of a gas treatment device of the third embodiment according to the present invention, in which (a) shows an example of circle, (b) an example of square, (c) an example of flat body with round end section, and (d) an example of rectangle.
Figure 6:
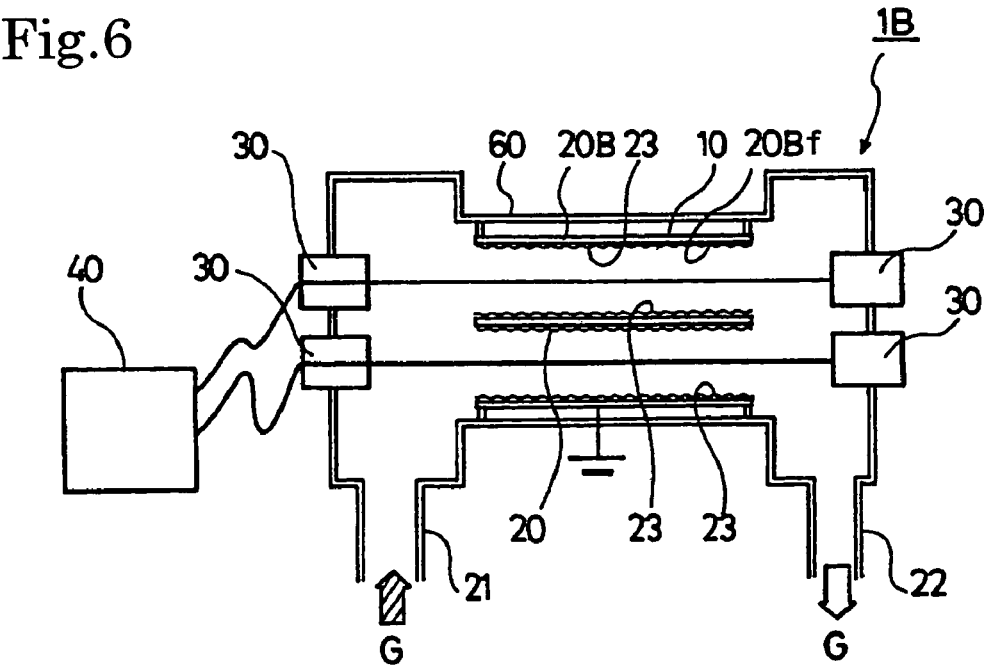
FIG. 6 is a schematic side cross-section showing another composition of the gas treatment device of the third embodiment according to the present invention.
Figure 7:
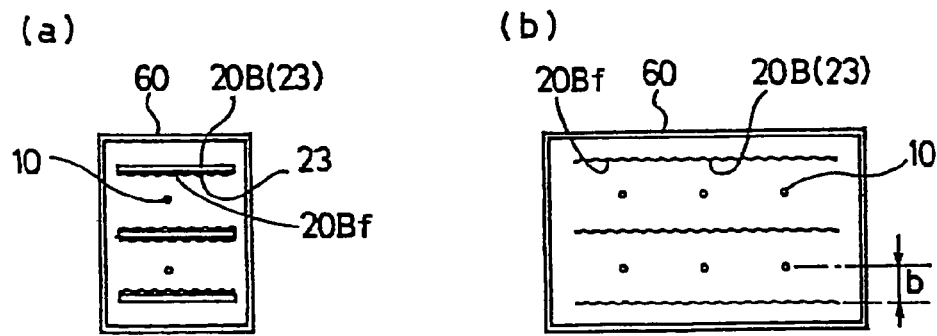
FIG. 7 shows an example of cross-section of a cylindrical body of another composition of the gas treatment device of the third embodiment according to the present invention, in which (a) an example having a single corona electrode between dust-collecting electrodes and (b) an example having a plurality of corona electrodes between dust-collecting electrodes.

The gas treatment device 1B of the third embodiment shown in FIG. 4 to FIG. 7 is composed to shape a dust-collecting electrode 20B with a sheet body facing a corona electrode 10 and to enclose this sheet body together with said corona electrode 10 by a gas-impermeable cylindrical body 60. Then, it is so composed to pass the gas G in this cylindrical body 60. FIG. 4 and FIG. 5 show a composition where the dust-collecting electrode 20B is made from a single sheet body or a pair of sheet bodies parallel to the corona electrode 10. And, FIG. 6 and FIG. 7 show a composition where the corona electrode 10 and the parallel sheet body dust-collecting electrode 20B are formed into a multiple stacking structure.

And, according to the present invention, the dust-collecting electrode 20B of the gas treatment device 1B of this third embodiment is provided with means for accelerating turbulence 23 on the facing surface 20Bf thereof or in the vicinity of the facing surface 20Bf, similar to the dust-collecting electrode 20 of the gas treatment device 1 of the first embodiment. Structure, disposition and so on of this means for accelerating turbulence 23 are composed similarly to the gas treatment device 1 of the first embodiment.

However, in case of forming the dust-collecting electrode 20B with a sheet body, the characteristic length D will be D=4S'/P' when it is formed by surrounding the corona electrode with sheet bodies. Here, the enclosed flow passage cross-section shall be S' and the enclosed length be wetted perimeter P'. In this case where the dust-collecting electrode 20B is shaped with sheet bodies of parallel flat plate, D=2b. Here, b is the distance between the corona electrode 10 and the flat plate 20B.

And, this dust-collecting electrode 20B is electrically grounded and kept at the ground potential, or kept at a predetermined potential as necessary. However, as it is not necessarily required to be gas-impermeable, as shown in FIG. 5(d) or FIG. 7(d), it may also be shaped with a punched screen or the like having an uneven structure. In this case, as the surface of the dust-collecting electrode 20B is already provided with an uneven structure, the treatment of a new surface or the arrangement of uneven structure become unnecessary.

Besides, as for the cooling of gas for obtaining liquid bridge formation effect in this composition, the cylindrical body 60 of the gas treatment device 1B of the third embodiment may also be composed similarly to the cylindrical body 20 of the gas treatment device 1 of the first embodiment. And, it may also cool the dust-collecting electrode 20B by a method such as making the dust-collecting electrode 20B with a box type or sheet type heat exchanger or the like, and circulating a coolant therein, or the like.

Now, a gas treatment device of a forth embodiment shall be described.

Figure 8:
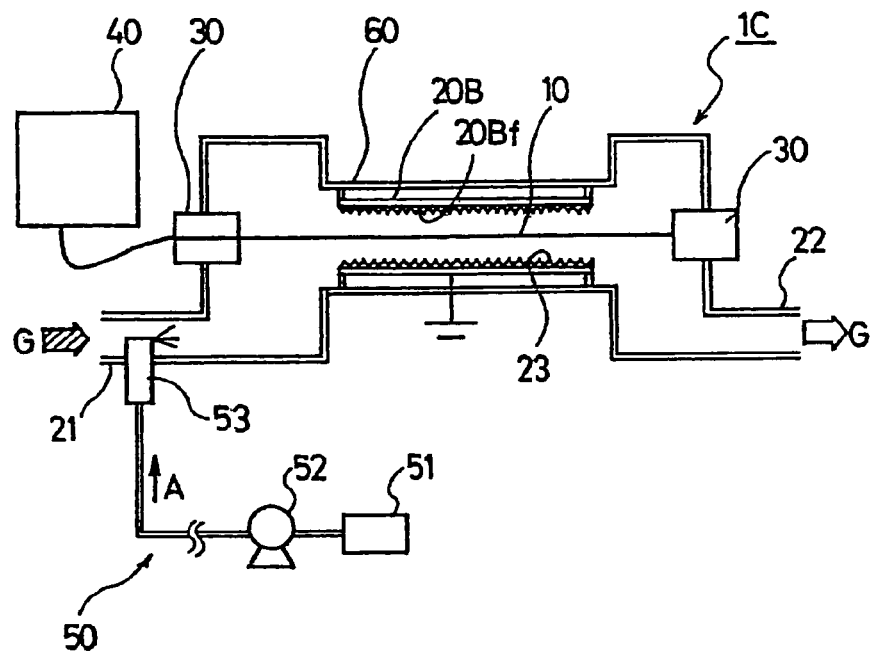
FIG. 8 is a schematic side cross-section showing a composition of a gas treatment device of a fourth embodiment according to the present invention.

The gas treatment device 1C of the fourth embodiment shown in FIG. 8 has an additive supply means 50 at the gas inlet part 21 of the gas treatment device 1B like the second embodiment. This additive supply means 50 supplies the gas G into the cylindrical body 20 with additive A to agglomerate or grow components in the gas G. The composition of this additive supply means 50 is similar to that of the additive supply means 50 of the gas treatment device 1A of the second embodiment. It should be noted that the gas treatment device 1C of the fourth embodiment has the same composition as the gas treatment device 1B of the third embodiment, except for the composition of this additive supply means 50.

According to the aforementioned gas treatment devices 1, 1A, 1B, 1C, as they provide the means for accelerating turbulence 23 to accelerate gas turbulence, on the facing surface 20f of a dust-collecting electrode 20B on the non-discharge side, facing the corona electrode 10, or, in the vicinity of this facing surface 20f, the agitation effect in the flow passage cross-section direction can be increased, by accelerating gas turbulence in the flow passage, especially, in the vicinity of the facing surface 20f, by this means for accelerating turbulence 23.

Therefore, the time necessary for charging components in the gas in the whole flow passage space can be reduced, the contact of charged particles with the facing surface of the dust-collecting electrode which faces the corona electrode can be facilitated, and the main flow direction flow rate of the gas in the vicinity of the facing surface can be lowered. Thereby, the capture of charged particles by the electrostatic force can further be accelerated. Consequently, the electrostatic agglomeration performance and electrostatic dust collecting performance to the charged particles can be improved remarkably. Moreover, the gas treatment device for performing electrostatic agglomeration and electrostatic dust collecting can be improved in performances, reduced in pressure loss, and, reduced size.

And, though the gas treatment devices 1, 1A, 1B, 1C of the present invention can be employed independently, they may also be used in combination with other dust collector, gas treatment unit, and so on.

For instance, the gas treatment devices 1, 1A, 1B, 1C can remove only fine particles equal or inferior to micron size or sub-micron size that can be hardly removed by the dust collector which is a dust collector for roughly capturing large particles such as a filter, scrubber and so on, and is disposed upstream of the gas treatment devices 1, 1A, 1B, 1C.

It may also so composed to purify gas components in the gas by installing a catalytic converter supporting a catalyst made of noble metal or the like on a ceramic honeycomb or metal honeycomb downstream the gas treatment devices 1, 1A, 1B, 1C of the present invention. This composition allows removing effectively particulate matters by the gas treatment device 1, 1A, 1B, 1C of the present invention, in case of treating the gas from a diesel engine. Consequently, the contamination of the surface of the downstream side catalyst can be limited, and the reaction efficiency on the catalyst surface can be kept high for a long period of time.

Besides, in the gas treatment devices 1, 1A, 1B, 1C of the present invention, sometimes, particulate matters deposits on the cylindrical body 20 or the facing surface 20f of the dust-collecting electrode 20B, buries the means for accelerating turbulence 23, lowering the turbulence acceleration effect and lowering the agglomeration performance and the dust collecting performance. In this case, as adopted for the ordinary electrostatic dust collector, it can also be composed to perform a mechanical regeneration treatment, by disposing vertically the cylindrical body 20, 60, and removing and collecting deposited particulate matters by vibration or impact.

Also, collected particulate matters can be burned and removed periodically during the operation, through direct heating of PM by an electric heater or an oil heater, heating of exhaust gas by fuel post-injection and so on, heating of exhaust gas by engine performance tuning or restriction of intake air and so on.

The gas treatment device of the present invention that has excellent effect as mentioned hereinabove, can be used extremely effectively as a gas treatment device of not only exhaust gas from the on-board internal combustion engine, but also exhaust gas from various industrial machines or stationary internal combustion engines, factory exhaust gas, power plant exhaust gas and so on, and also as gas treatment device of various factories of manufacturing, fields of medical care, or the like.

What is claimed is:

1. A gas treatment device comprising a corona electrode and a dust-collecting electrode facing said corona electrode, and forming corona discharge in gas passing through between said corona electrode and said dust-collecting electrode by applying a high voltage between them to thereby agglomerate or collect components in the gas, wherein:

a means for accelerating turbulence flow of the gas in the vicinity of a surface of said dust-collecting electrode facing said corona electrode is provided on said surface of said dust-collecting electrode or in the vicinity thereof, the gas contacts the means for accelerating, and the means for accelerating has an uneven structure with a relative roughness $\epsilon/D$ of not less than 0.01 nor more than 0.1, where a characteristic length of said dust-collecting electrode is D and a maximum roughness of $\epsilon$, and an overall length of said dust-collecting electrode is 3 to 20 times D.

2. The gas treatment device of claim 1, wherein said dust-collecting electrode is formed with a gas-impermeable cylindrical body surrounding said corona electrode and gas is made to pass through the interior of said cylindrical body.

3. The gas treatment device of claim 1, wherein said dust-collecting electrode is formed with a sheet body facing said corona electrode, said sheet body is surrounded together with said corona electrode by a gas-impermeable cylindrical body, and thus the gas is made to pass through the interior of said cylindrical body.

4. The gas treatment device of claim 1, wherein said uneven structure is formed inclining an upstream face of a convex portion to a downstream side thereof.

5. The gas treatment device of claim 1, wherein a gas-contact portion of said means for accelerating turbulence flow is made of a conductive material.

6. The gas treatment device of claim 1, wherein a gas-contact portion of said means for accelerating turbulence flow is made of an insulating material.

7. The gas treatment device of claim 1, wherein a gas-contact portion of at least one of said means for accelerating turbulence flow and said dust-collecting electrode is provided with a catalyst.

8. The gas treatment device of claim 2, wherein said cylindrical body is naturally air-cooled or forcibly cooled.

9. The gas treatment device of claim 2 comprising an additive supply means for supplying the gas to be introduced into the interior of said cylindrical body with additive to agglomerate or grow components in the gas.

10. The gas treatment device of claim 2 comprising a plurality of gas treatment units, each composed of said corona electrode and said dust-collecting electrode made of a gas-impermeable cylindrical body surrounding said corona electrode.

11. The gas treatment device of claim 3 comprising a plurality of gas treatment units, each composed of a combination of said corona electrode and said dust-collecting electrode formed by the sheet body facing said corona electrode in one cylindrical body.

12. The gas treatment device of claim 3 comprising a plurality of gas treatment units, each composed of a combination of said corona electrode, said dust-collecting electrode formed by the sheet body facing said corona electrode, and the cylindrical body surrounding said corona electrode and said dust-collecting electrode.

13. The gas treatment device of claim 1, wherein said uneven structure is in a plate form and the dust-collecting electrode has parallel flat plates in a relationship of $D=2b$, wherein b is a distance between the corona electrode and one of the flat plates.

14. A gas treatment device, comprising:
a corona electrode and a dust-collecting electrode facing said corona electrode, and forming corona discharge in gas passing between said corona electrode and said dust-collecting electrode by applying a high voltage between them to thereby collect components in the gas,
wherein a gas turbulence accelerator is provided on an interior surface of said dust-collecting electrode or in the vicinity thereof, facing said corona electrode, the gas contacts the gas turbulence accelerator, and the gas turbulence accelerator has an uneven structure with a relative roughness $\epsilon/D$ of not less than 0.01 nor more than 0.1, where a characteristic length of said dust-collecting electrode is D and a maximum roughness of $\epsilon$, and an overall length of said dust-collecting electrode is 3 to 20 times D.

15. The gas treatment device of claim 14, wherein said dust-collecting electrode is formed with a gas-impermeable cylindrical body surrounding said corona electrode and the gas is made to pass through the interior of said cylindrical body.

16. The gas treatment device of claim 14, wherein said dust-collecting electrode is formed with a sheet body facing said corona electrode, said sheet body is surrounded together with said corona electrode by a gas-impermeable cylindrical body, and thus the gas is made to pass through the interior of said cylindrical body.

17. The gas treatment device of claim 14, wherein said uneven structure is formed inclining an upstream face of a convex portion to a downstream side thereof.

18. The gas treatment device of claim 14, wherein said uneven structure expanding in a plate form and the dust-collecting electrode has parallel flat plates in a relationship of $D=2b$, wherein b is a distance between the corona electrode and one of the flat plates.

* * * * *